United States Patent [19]

Friday et al.

[11] 3,785,131
[45] Jan. 15, 1974

[54] FRUIT HARVESTING APPARATUS

[76] Inventors: David G. Friday; Philip L. Friday, both of R.R. No. 2, Hartford Township, Van Buren County, Mich. 49057

[22] Filed: Sept. 15, 1972

[21] Appl. No.: 289,576

[52] U.S. Cl. .............................. 56/328 TS, 56/329
[51] Int. Cl. ............................................ A01g 19/06
[58] Field of Search ............. 56/328 TS, 329, 328 R

[56] References Cited
UNITED STATES PATENTS

| | | | |
|---|---|---|---|
| 3,537,246 | 11/1970 | Pool et al. ..................... | 56/328 TS |
| 3,555,799 | 1/1971 | Gerrans .......................... | 56/328 TS |
| 3,596,455 | 8/1971 | Adrian ............................ | 56/328 TS |
| 3,474,609 | 10/1969 | Alberti et al. ................... | 56/329 |
| 3,120,091 | 2/1964 | Gould et al. .................... | 56/328 TS |

Primary Examiner—Louis G. Mancene
Assistant Examiner—J. N. Eskovitz
Attorney—Woodhams, Blanchard & Flynn

[57] ABSTRACT

A fruit harvester having a limb shaking apparatus mounted in association with a catching structure adapted to be disposed below a tree for catching the dislodged fruit. The shaking apparatus includes a telescopic boom assembly which can be linearly extended into the tree, and which can also be horizontally and vertically swingably displaced to enable jaws mounted adjacent the end of the boom to be positioned in gripping engagement with a selected limb. A vibrator mechanism is mounted adjacent the end of the boom and is connected to the jaws for causing vibration thereof in a direction substantially perpendicular to the longitudinally extending direction of the boom. The vibrator mechanism and the jaws are mounted on a head assembly which can be angularly displaced about the longitudinal axis of the boom.

14 Claims, 9 Drawing Figures

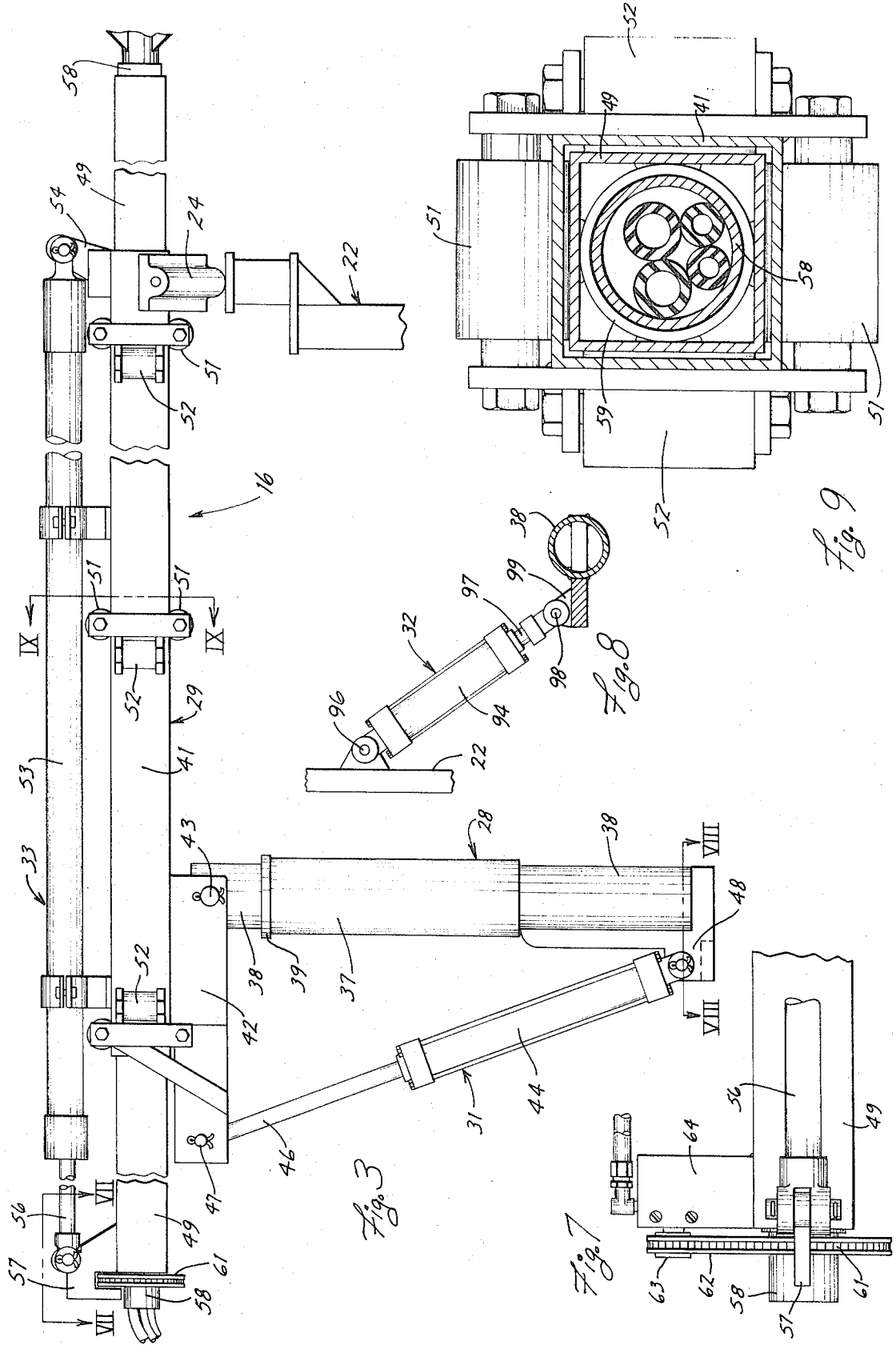

FRUIT HARVESTING APPARATUS

BACKGROUND OF THE INVENTION

1. Field of the Invention

This invention relates to a fruit harvester and, in particular, to an improved limb-type tree shaking apparatus for imposing a vibratory force on the limbs of a tree for dislodging fruit from the tree so that fruit and nut harvesting operations can be carried out rapidly.

2. DESCRIPTION OF THE PRIOR ART

Tree trunk — and limb — shaking machines utilizing rotating weights or rotating crank mechanisms for creating a vibratory force have been in use for many years for harvesting fruits and nuts. Various types of shaking machines have been developed for this purpose, which machines are structurally different in many ways, particularly as to the manner in which the vibration force is achieved and as to the manner in which the machine engages the tree.

Many tree shakers use an elongated boom having suitable clamping jaws disposed for gripping a limb or trunk of a tree so that a vibratory force can be imposed on the limb or trunk for dislodging the fruit or nuts. Limb-type tree shakers have been widely used because they are believed to cause minimum damage to the tree, while permitting relatively efficient harvesting of the fruit from the individual limbs. However, all of the known limb-type shakers of which we are aware utilize a vibrator mechanism which results in the development of a vibratory force and motion in a direction substantially parallel to a longitudinal direction of the boom. Utilization of this type of vibratory force and motion generally requires that the vibration be of rather high frequency and low amplitude to effect removal of the fruit. Such mechanisms are effective and satisfactory for harvesting many small nuts and fruits, such as cherries, but they have not been satisfactory for harvesting other larger fruits, particularly apples and oranges.

A further disadvantage of known limb-type shakers is that the vibration force cannot be adjusted in terms of direction so as to be oriented in the optimum manner relative to the limb and the boom. Rather, in the known devices, the vibratory force always exists in the lengthwise direction of the boom and cannot be adjusted to compensate for the relative orientation of the boom and limb.

Accordingly, it is an object of the present invention to provide an improved limb-type shaker for harvesting fruit and which overcomes the above-mentioned disadvantages and which is particularly adapted for harvesting fruits, such as apples, which cannot be harvested effectively by prior equipment.

Particularly, it is an object of the present invention to provide an improved limb-type shaker, as aforesaid, which utilizes a shaking mechanism capable of imposing on the limb a shaking motion in a direction substantially perpendicular to the longitudinal extent of the boom.

A further object of the present invention is to provide an improved shaker, as aforesaid, which applies a low-frequency, large-amplitude shaking motion on limbs to cause efficient and effective removal of large fruit, such as apples, from the limbs.

A still further object of the present invention is to provide an improved shaker, as aforesaid, which permits the direction of the shaking motion to be easily adjusted within a plane substantially perpendicular to the longitudinal direction of the boom so that the shaking motion can be selectively oriented as desired to compensate for the positional relationship of the boom and the limb, and to permit the shaking motion to be selected to cause a substantially vertical shaking of the limb to thus permit the shaking motion to be assisted by gravity for effecting removal of the fruit from the limb.

Another object of the present invention is to provide an improved shaker, as aforesaid, which can be telescopically extended and vertically and horizontally swingably moved to permit the jaws to have access to a substantial number of the limbs of the tree.

Still another object of the present invention is to provide an improved fruit harvester which incorporates therein an improved shaker, as aforesaid, which harvester also utilizes a pair of catcher units which are positionable on opposite sides of a tree trunk to provide a catching surface under the complete tree, each catcher unit having a separate limb shaker mounted thereon to permit substantially all of the limbs of the tree to be accessible for permitting shaking thereof without requiring that the catcher units be moved about relative to the ground.

Additional objects of the present invention will be apparent to persons acquainted with devices of this type upon reading the following specification and inspecting the accompanying drawings.

BRIEF DESCRIPTION OF THE DRAWINGS

FIG. 3 is a fragmentary side elevational view of the shaker constructed according to the present invention, this view being taken substantially along the line III—III of FIG. 1.

FIG. 7 is a fragmentary view taken substantially along the line VII—VII of FIG. 3 and illustrating the rearward end of the boom assembly.

FIG. 8 is a fragmentary sectional view taken substantially along the line VIII—VIII of FIG. 3 and illustrating the structure for causing horizontal swinging movement of the boom assembly.

FIG. 9 is an enlarged sectional view taken substantially along the line IX—IX of FIG. 3.

Figure 1:
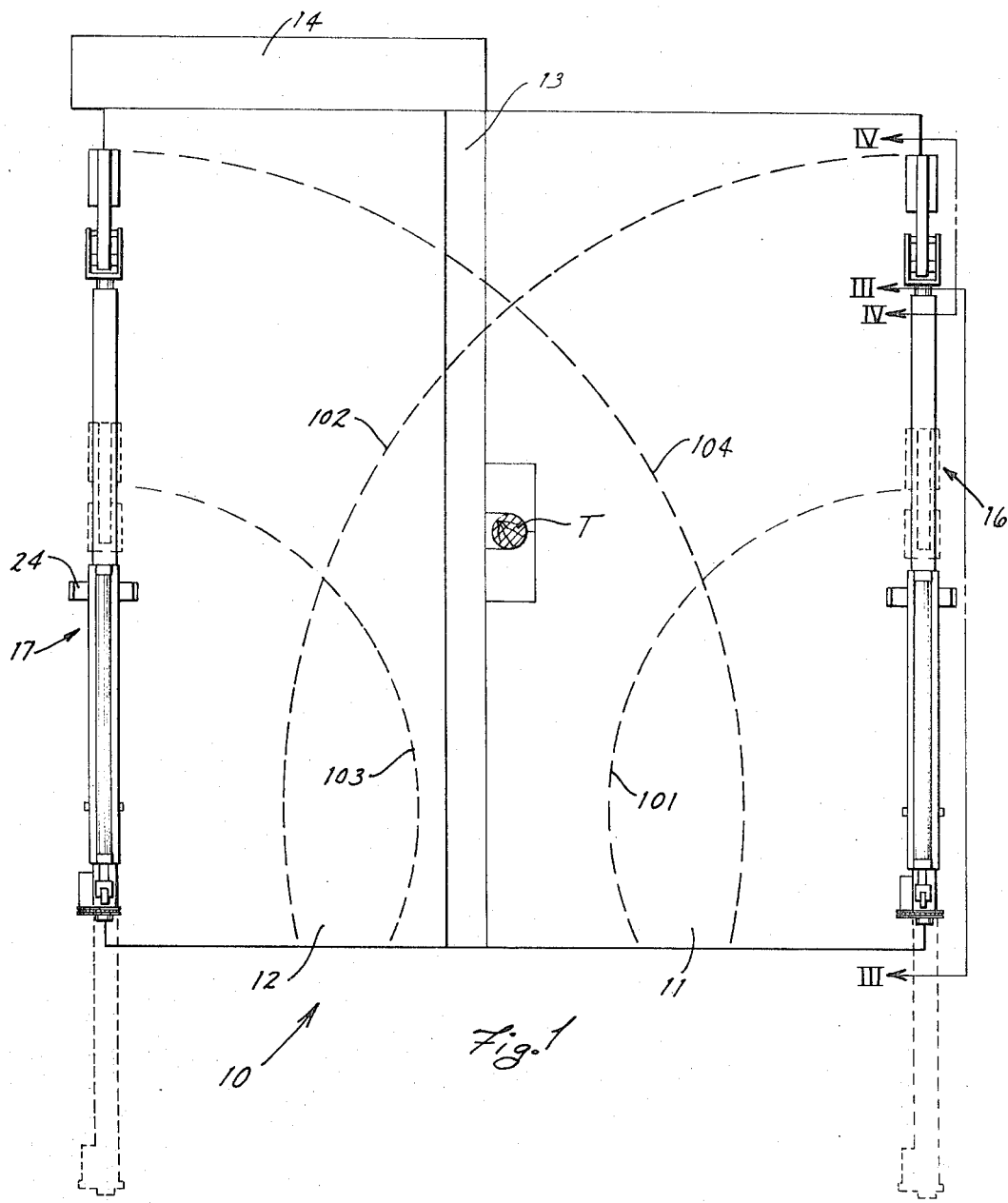
FIG. 1 is a schematic plan view of a fruit harvester constructed according to the present invention and illustrating the manner in which the catching structure of the harvester is disposed relative to and in surrounding relationship to the trunk of a tree.

Certain terminology will be used in the following description for convenience in reference only and will not be limiting. For example, the words "upwardly," "downwardly," "leftwardly" and "rightwardly" will refer to directions in the drawings to which reference is made. The words "inwardly" and "outwardly" will refer to directions toward and away from, respectively, the geometric center of the device and designated parts thereof. Said terminology includes the words above specifically mentioned, derivatives thereof and words of similar import.

SUMMARY OF THE INVENTION

The objects and purposes of the present invention are met by providing a fruit harvester having a pair of catcher units which are positioned adjacent one another in surrounding relationship to the trunk of a tree for catching the fruit dislodged from the tree. Each of the catcher units has a limb-type shaker mounted thereon for enabling substantially all of the limbs of the tree to be individually shaken while maintaining the catcher units in a single position under the tree.

The shaker according to the present invention includes an elongated telescopic boom assembly which is swingable both horizontally and vertically to enable the boom assembly to be positioned for access to substantially any desired limb. A head assembly is mounted on the free end of the boom and includes a pair of jaws adapted for gripping the limb. The jaws are connected to a shaking mechanism which imposes a back and forth shaking motion on the jaws in a direction substantially perpendicular to the longitudinal extent of the boom. The head assembly is swingable about the longitudinal axis of the boom to permit positioning of the jaws relative to the limb, while also enabling the direction of the shaking force imposed on the jaws to be selectively directionally positioned within a plane substantially perpendicular to the longitudinal direction of the boom. The rotational adjustment of the shaking force relative to the boom axis enables the shaker to impose a low-frequency large-amplitude vibration on the limb in a substantially vertical direction to facilitate removal of relatively heavy fruit, such as apples, from the limb.

DETAILED DESCRIPTION

FIG. 1 illustrates a fruit harvester 10 adapted for use in conjunction with a fruit tree for permitting harvesting of the fruit or nuts on the tree. The fruit harvester 10 comprises a catching structure which includes catcher units or sections 11 and 12 adapted to be disposed directly opposite one another and positioned under the branches of the tree in surrounding relationship to the trunk T. One of the catcher units may be provided with a conventional conveyer 13 along the lower edge thereof for collecting the fruit and for transporting same to one end of the harvester for further handling in whatever manner desired. For example, the conveyor 13 may communicate with a further inclined conveyor 14, which in turn may be used for depositing the collected fruit into suitable boxes or containers. The structure of the catcher unit and of the conveyors is conventional, and thus further description of same is not believed necessary.

According to the present invention, the catcher unit 11 is provided with a limb-type shaker 16 associated therewith. A further limb-type shaker 17 is associated with the other catcher unit 12. The shakers 16 and 17 are identical and thus only one of the shakers will be described in detail. However, provision of the pair of shakers 16 and 17 is highly desirable because the shakers 16 and 17 permit substantially all of the limbs to be accesssible for shaking while enabling the catcher units 11 and 12 to be maintained in a stationary position beneath the tree.

Figure 2:
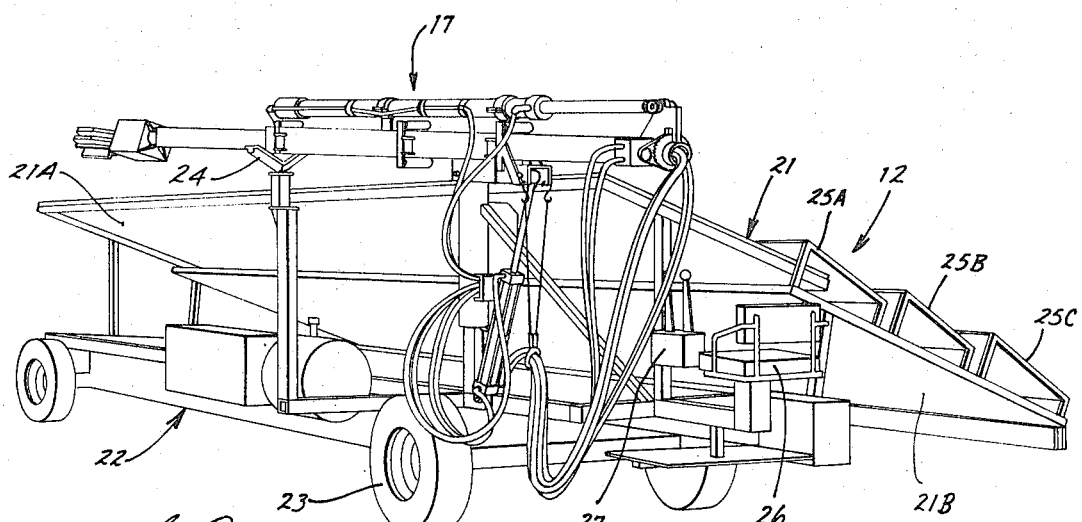
FIG. 2 is a perspective view of one of the catching units of the present invention and illustrating thereon the improved shaker of the present invention.

Referring now to FIG. 2, there is illustrated the catcher unit 12 which includes a substantially conventional catching surface 21 which slopes downwardly toward the center of the tree. The catching surface 21 comprises two sections 21A and 21B whose adjacent edges overlap. Decelerator strips 25A, 25B and 25C are mounted above the section 21B. The decelerator strips are inclined downwardly with respect to section 21B in a direction toward the lower end of said section. Fruit falling on decelerator strip 25A flow under strips 25B and 25C so as to reduce the number of fruit that drop onto other fruit and thereby minimize bruising. Similarly, fruit falling on strip 25B flow under strip 25C.

The catching surface 21 is supported on rigid frame 22 provided with a plurality of ground-engaging wheels 23. The shaker 17 is mounted on the frame 22 adjacent one corner of the catcher unit 12 and, when in a nonoperating position, can extend along the upper edge thereof and resting on a pedestal 24 which constitutes a portion of the frame 22. The catcher unit 12 has a control console which includes a chair 26 for the operator and a control box 27 which has suitable control levers associated therewith for permitting control of the shaker 17.

Figure 4:
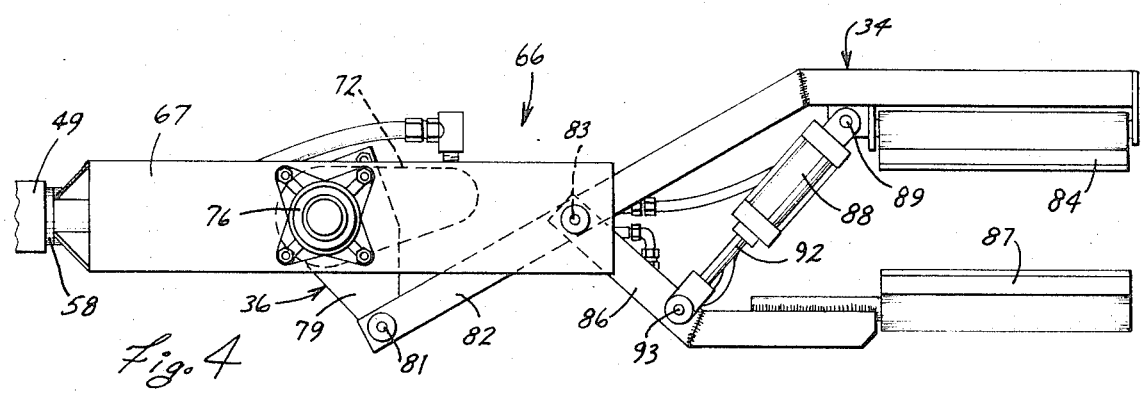
FIG. 4 is a side elevational view of the jaw structure and shaker mechanism as mounted on the free end of the shaker boom, this view being taken substantially along the line IV—IV of FIG. 1.

Considering now the structure of the shaker 16 or 17, and referring specifically to FIGS. 3 and 4, in general, the shaker includes a pedestal assembly 28 which pivotably supports the shaker on the frame 22 for permitting horizontal swinging movement of the shaker. The shaker includes a telescopic boom assembly 29 disposed adjacent the upper end of the pedestal assembly 28 and connected to a first motor means 31 for enabling the boom to be vertically swingably displaced. A second motor means 32 is associated with the pedestal assembly for permitting horizontal swinging movement of the boom assembly 29. A third motor means 33 permits the boom assembly 29 to be longitudinally extended and contracted for enabling the boom assembly to be inserted into and between the limbs of a tree. The boom assembly 29 is provided with a movable jaw assembly 34 adjacent the free end thereof, which jaw assembly is adapted for clampingly engaging a selected limb. The jaw assembly 34 is in turn connected to shaker mechanism 36 for permitting shaking of the limb.

The pedestal assembly 28 includes a vertically elongated sleeve bearing 37 which is fixedly secured to the frame 22 adjacent one corner thereof. A vertically elongated pivot shaft 38 is rotatably supported in the sleeve bearing 37 and is provided with an annular collar 39 adjacent the upper end thereof for axially retaining the pivot shaft 38 within the sleeve bearing 37.

The telescopic boom assembly 29 is supported on the upper end of the shaft 38. The boom assembly 29 includes an elongated outer guide and support tube 41 having a yokelike bracket 42 fixedly secured to the under surface thereof. One end of the bracket 42 is pivotably connected to the upper end of the pivot shaft 38 by means of a pivot pin 43. The other end of bracket 42 is interconnected to the first motor means 31 for enabling the boom assembly 29 to be vertically swingably displaced about an axis defined by the pivot pin 43. For this purpose, the first motor means 31 comprises a conventional double-acting fluid pressure cylinder 44 which has a piston rod 46 extending from the upper end thereof, which piston rod is in turn pivotally connected at 47 to the rearward end of the bracket 42. The lower end of the cylinder housing is likewise pivotally connected to a flange 48 which is fixedly connected to the lower end of the pivot shaft 38.

The boom assembly 29 further includes an elongated inner support tube 49 disposed within the outer tube 41 and having a length such that the opposite ends of the tube 49 extend outwardly beyond the adjacent ends of the outer tube 41. The outer tube 41 has a plurality of pairs of guide rollers 51 and 52 mounted thereon and disposed for rolling engagement with the outer sides of the inner tube 49 for enabling the inner tube 49 to be slideably displaced longitudinally of the outer tube 41.

The slideable displacement of the inner tube 49 relative to the outer tube 41 is caused by the third motor means 33 which, in the illustrated embodiment, comprises a conventional double-acting fluid pressure cylinder 53 which has one end of its cylinder housing pivotally connected to a bracket 54 which is fixedly secured to one end of the outer guide tube 41. A piston rod 56 extends from the other end of the cylinder housing and is pivotally connected to a bracket 57 which is fixedly and stationarily secured to the free end of the inner tube 49.

An elongated control sleeve 58 is positioned within and extends longitudinally of the inner support tube 49, being rotatably supported therein by means of intermediate bushings 59. The rearward end of the control sleeve 58 extends beyond the adjacent end of the inner tube 49 and has a sprocket 61 drivingly connected thereto. The sprocket 61 is in driving engagement with a chain 62 which is driven from a driving sprocket 63, the latter being drivingly connected to the output shaft of a conventional hydraulic motor 64. The motor 64 is mounted on the side of the inner tube 49 whereby energization of motor 64 causes a driving rotation of the sprocket 61 and of the control sleeve 58 secured thereto.

Figure 5:
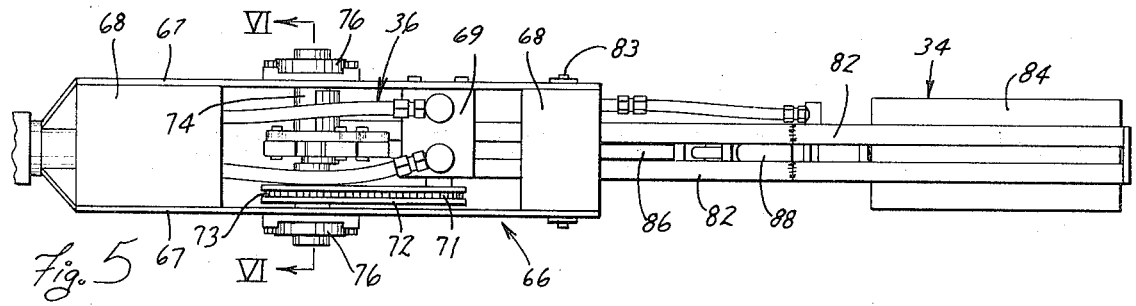
FIG. 5 is a plan view of the jaw structure and shaker mechanism illustrated in FIG. 4.
Figure 6:
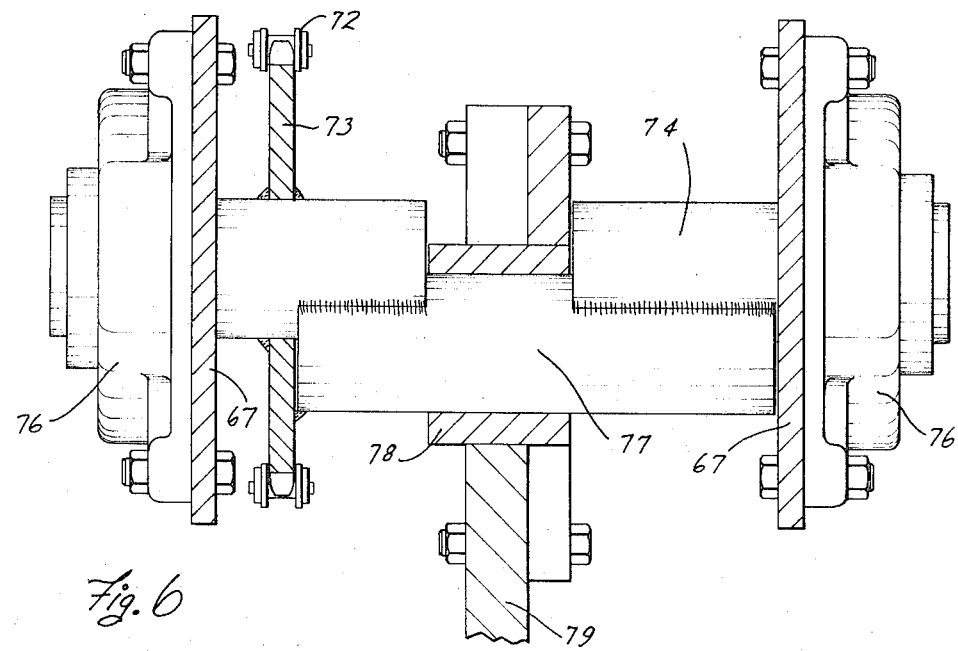
FIG. 6 is an enlarged sectional view illustrating the crank structure of the shaker mechanisn, this view being taken substantially along the line VI—VI of FIG. 5.

The forward end of the control sleeve 58 extends outwardly beyond the forward end of the inner tube 49 and is fixedly secured to a head assembly 66 (FIGS. 4 and 5) which includes the jaw assembly 34 and the shaker mechanism 36. The head assembly 66 includes a housing structure which has a pair of substantially parallel side plates 67 fixedly interconnected by transverse web plates 68. The shaker mechanism 36 is mounted within the housing defined by the side plates 67 and includes a hydraulic motor 69 which is fixedly mounted on one of the side plates 67 and has an output shaft mounting thereon a drive sprocket 71. The drive sprocket 71 drives a chain 72 which is in driving engagement with a driven sprocket 73. The driven sprocket 73 is drivingly connected to a crankshaft 74 which extends between the side plates 67 and is rotatably supported thereon by means of bearing assemblies 76.

The crankshaft 74 has an eccentric crank 77 formed thereon and positioned between the ends thereof, which crank 77 is rotatably disposed within and surrounded by bushing 78 which comprises one end of an elongated pitman or connecting rod 79. The other end of the pitman 79 is connected by a pivot 81 to one end of an elongated jaw support lever 82. The lever 82 is pivotally connected intermediate its ends by a pivot pin 83 to the housing side plates 67. The opposite end of the lever 82 is provided with a rectangular padlike jaw 84 fixedly secured on the inner side thereof, which pad in the preferred embodiment is constructed of a deformable material, such as a plastic material, which is capable of being deformed when the clamping jaw is moved into engagement with the limb of a tree to enable the pad to contact the limb over a substantial arcuate extent thereof. For this purpose, it has been discovered that constructing the pad of a rubbery material results in the pad having very desirable properties.

The jaw assembly 34 includes a further jaw support lever 86 which has one end thereof pivotably connected to the housing side plates 67 by means of the pivot 83. The jaw support lever 86 has a further padlike jaw 87 of deformable material provided on the free end thereof in opposed relationship to the abovementioned jaw 84.

The jaw support levers 82 and 86 are interconnected for movement toward and away from one another by means of a further motor which, in the disclosed embodiment, comprises a conventional double-acting fluid pressure cylinder 88. The fluid pressure cylinder 88 has one end of its cylinder housing pivotably interconnected at 89 to the jaw support lever 82 at a location disposed between the pivot 83 and the jaw 84. A piston rod 92 extends outwardly from the other end of the cylinder 88 and is pivotably interconnected at 93 to the other jaw support lever 86, which pivot 93 is located between the pivot 83 and the jaw 87.

To permit horizontal swinging movement of the boom assembly 29, the pivot shaft 38 is connected to the second motor means 32 (FIG. 8) which, in the illustrated embodiment, comprises a conventional double-acting fluid pressure cylinder 94. The end of the cylinder housing is pivotably connected at 96 to a part of the catcher frame 22. A piston rod 97 slideably extends from the other end of the cylinder housing and is pivotably connected at 98 to a stationary flange 99 which is fixedly secured to the lower end of the pivot shaft 38. Energization of the fluid cylinder 94 thus enables the shaft 38 and the boom assembly 29 mounted on the upper end thereof to be horizontally pivotably moved through an angle of approximately 90°.

OPERATION

The operation of the harvester constructed according to the present invention will be briefly described to ensure a complete understanding thereof.

When the harvester 10 of the present invention is to be used for harvesting fruit from a tree, the catcher units 11 and 12 are driven into a position wherein they are disposed directly under the tree with the trunk T being disposed between the catcher units substantially as illustrated in FIG. 1. During this initial positioning of the catcher units around the trunk of the tree, the shakers 16 and 17 are preferably maintained in a stationary position wherein they extend horizontally along the upper edges of the catcher units and rest on the pedestals 24 substantially as illustrated in FIG. 3.

Assuming that the catcher units 11 and 12 are properly positioned under a tree and assuming further that the shakers 16 and 17 are each in their retracted positions as illustrated by dotted lines in FIG. 1, then the shakers 16 and 17 will each be individually activated to enable them to be moved into gripping engagement with selected limbs of the tree to permit shaking of the limbs for effecting removal of the fruit or nuts. For this purpose, the fluid pressure cylinder 44 will be energized to pull the piston rod 46 downwardly to thus enable the telescopic boom assembly 29 to be vertically elevated about the pivot pin 43. The fluid pressure cylinder 94 will likewise be energized to cause the pivot shaft 38 and the boom assembly 29 to be horizontally swingably moved inwardly in a direction toward the limbs of the tree to enable the boom assembly to be properly aligned with the selected limb. With the boom assembly in its proper horizontal and vertical orientation relative to the pedestal assembly 28, then the boom assembly is telescopically extended by energization of the fluid pressure cylinder 53 whereupon the piston rod 56 is pulled inwardly into the cylinder so that the forward end of the inner tube 49 is moved outwardly away from the adjacent end of the outer tube 41, thereby causing the head assembly 66 to be extended upwardly into and among the limbs of the tree. When the head assembly 66 is moved upwardly into the limbs of the tree, and assuming that the jaws 84 and 87 are in an open position, then the head assembly 66 can be suitably rotated about the longitudinally extended axis of the boom assembly by energizing the hydraulic motor 64, which in turn causes rotation of the control sleeve 58 and the head assembly 66 so as to cause the jaws 84 and 87 to be properly oriented with respect to the selected limb. It will be understood that minor adjustments of the positions of the jaws can be effected by further actuation of motors 31, 32 and 33, as needed. When the jaws are properly oriented on opposite sides of the selected limb, then the fluid pressure cylinder 88 is energized to cause the jaw support levers 82 and 86 to pivotably swing inwardly toward one another about the pivot pin 83, thereby causing the jaw pads 84 and 87 to be moved into snug and secure clamping engagement with the opposite sides of the limb. With the shaker so positioned, then the hydraulic motor 69 of the shaker mechanism 34 is energized to cause rotation of the crank shaft 74, which in turn causes rotation of the eccentric crank 77. This causes reciprocation of the pitman 79, which in turn causes the jaw support levers 82 and 86 to be simultaneously oscillated about the pivot 83. In this manner, an oscillating vibration is imposed on the limb for causing dislodgment of the fruit or nuts therefrom.

As is apparent from the above discussion, the present invention results in a shaking force and motion being imposed on the limb in a direction which is substantially perpendicular to the longitudinal direction of the boom assembly. Further, since the complete head assembly 66 can be rotated about the longitudinally extending axis of the boom, this permits the jaws to be disposed in clamping relationship with a limb in a selected orientation so that the major shaking force and motion occurs substantially in a vertical direction. This is highly desirable since the force of gravity acting on the fruit, such as apples, thus effectively assists the shaking force in causing the fruit to be separated from the tree. The present invention thus permits a rather large-amplitude and low-frequency vibration to be effectively utilized for causing dislodgment of the fruit or nuts from the limb, without causing any serious damage to the limb.

Further, since the present invention utilizes the two catcher units 11 and 12, each of which is provided with its own shaker 16 or 17, the present invention enables substantially all of the limbs to be accessible for permitting removal of fruit therefrom without requiring any intermediate movement of the catcher units. For example, the telescopic boom assembly associated with the shaker 16 enables same to be effectively horizontally swingably displaced within an arcuate region defined between the dotted lines 101 and 102 in FIG. 1, whereby the shaker 16 can thus effectively reach a great majority of the branches of the tree while maintaining the catcher unit in one position beneath the tree. Similarly, the telescopic extension of the boom assembly associated with the shaker 17 enables the shaker 17 to effectively reach any limbs which are defined within an arcuate region defined between the dotted lines 103 and 104. Thus, the two shakers 16 and 17 either alone or in combination have access to all of the critical limb area of the tree so that substantially all of the limbs can be gripped and vibrated while maintaining the catcher units 11 and 12 in a single stationary position under the tree. This obviously greatly simplifies the overall shaking of the tree and increases the efficiency of the harvesting operation.

In a practical embodiment of the present invention, the telescopic shaker has a minimum length of 13 feet, with the telescopic boom of the shaker being extendible to provide a boom length of 23 feet. Further, the shaker head assembly can obviously be located at any position intermediate these extremes. Accordingly, this wide range of telescopic movement of the jaw assembly, in conjunction with the manner in which the shakers 16 and 17 are positioned to provide effective coverage of the complete tree, results in the fruit harvester of the present invention being effective to permit complete harvesting of fruit from all of the limbs of the tree while maintaining the catching structure of the harvester at a single location relative to the tree.

While the disclosed embodiment uses fluid motors and fluid pressure cylinders, preferably of the hydraulic type, it will be recognized that other conventional motors and power sources can be used if so desired.

Although a particular preferred embodiment of the invention has been disclosed above for illustrative purposes, it will be understood that variations or modifications thereof which lie within the scope of the appended claims are fully contemplated.

We claim:
1. A tree shaking apparatus, comprising:
   frame means;
   elongated telescopic boom means;
   mounting means coacting between said boom means and said frame means for permitting said boom means to be both vertically and horizontally swingably displaced relative to said frame means;
   said boom means including at least first and second telescopic boom sections with one of said sections being interconnected to said mounting means and the other section being slideably movable relative to said one section to enable the length of said boom means to be telescopically lengthened or shortened;
   said boom means further including a head assembly connected to one end of said other boom section and means rotatably supporting said head assembly for rotation about the longitudinally extending axis of said boom means, said head assembly including limb engaging means having a pair of opposed and relatively movable jaw members positioned for gripping engagement with a selected limb of a tree;

said head assembly further including shaking means operatively connected to said limb engaging means for causing back and forth shaking thereof in a direction substantially perpendicular to the longitudinal extending direction of said boom means;

first drive means operatively coacting with said boom means for selectively causing horizontal and vertical swinging movement thereof relative to said frame means;

second drive means coacting with the sections of said boom means for causing relative movement between said first and second boom sections; and third drive means operatively interconnected to said head assembly for causing rotation of same about said longitudinally extending axis, said third drive means including an elongated control member extending longitudinally of and rotatably supported within said other boom section, said control member having one end thereof fixedly connected to said head assembly, the other end of said control member being positioned adjacent the other end of said other boom section, and drive motor means operatively connected to the other end of said control member for causing rotation of same relative to said other boom section.

2. A tree shaker apparatus, comprising:

frame means;

an elongated extendable boom means mounted adjacent one end thereof on said frame means for pivotal movement about both vertical and horizontal axes; and a shaker assembly mounted on the other end of said boom means, said shaker assembly comprising jaw means for gripping a limb of the tree, means mounting said jaw means for back and forth movement in a direction transverse to the longitudinal axis of said boom means, and means for opening and closing said jaw means;

said shaker assembly also including a single shaker mechanism connected to said jaw means for moving same back and forth in said transverse direction.

3. An apparatus according to claim 2, wherein said jaw means includes a pair of jaw support levers each having a limb-engaging jaw thereon and means pivotably connecting said jaw support levers to said shaker assembly for pivotal movement of said jaw support levers about a common axis; and said shaker mechanism including an eccentric crank mechanism, drive means connected to said eccentric crank mechanism for rotating same, and connecting link means coacting between said eccentric crank mechanism and only one of said jaw support levers for causing oscillation of said jaws in said transverse direction.

4. An apparatus according to claim 3, wherein said means for opening and closing said jaw means includes fluid pressure cylinder means connected between said pair of jaw support levers for causing said jaw support levers to be relatively moved toward and away from one another.

5. An apparatus according to claim 2, wherein said shaker mechanism includes means for imposing on said jaw means a low frequency, large amplitude vibration.

6. An apparatus according to claim 2, wherein said shaker mechanism includes rotatable eccentric means drivingly coupled to one of said jaw means for causing positive driving thereof when a limb is being shaken.

7. An apparatus according to claim 2, wherein said shaker assembly includes housing means mounted on the other end of said boom means for rotation about said longitudinal axis, said housing means having said jaw means movably supported thereon, and drive means operatively connected to said housing means for rotating same about said longitudinal axis.

8. An apparatus according to claim 7, wherein said drive means includes an elongated rotatable control member extending substantially parallel to the longitudinal axis of said boom means, said elongated control member having one end thereof drivingly connected to said housing means and the other end thereof positioned adjacent said one end of said boom means, and motor means operatively connected to the other end of said control member for causing rotation thereof about an axis substantially parallel to said longitudinal axis.

9. An apparatus according to claim 7, wherein said extendable boom means includes at least first and second telescopic boom sections slidably movable relative to one another, one of said boom sections being interconnected to said frame means and the other boom section being slidably movable relative to said one boom section, said shaker assembly being mounted on the free end of said other boom section.

10. An apparatus according to claim 7, wherein said shaker mechanism includes rotatable motor means mounted on said housing means, shaft means connected to and rotatably driven by said motor means, said shaft means being rotatably supported on said housing means, and eccentric means connected between said rotatable shaft means and said jaw means for causing back and forth movement thereof.

11. An apparatus according to claim 10, wherein said jaw means includes a pair of jaw support levers pivotably supported on said housing means and each having a limb-engaging jaw thereon, and said rotatable eccentric means being drivingly coupled to one of said jaw support levers for causing a periodic back and forth movement of said jaws through a predetermined stroke.

12. In a tree shaking apparatus having wheel-supported frame means, catcher means mounted on said frame means and adapted to be disposed beneath the branches of a tree to catch fruit dislodged from the tree, elongated extendable boom means mounted adjacent one end thereof on said frame means for pivotable movement about both a vertical and a horizontal axis, and shaking means mounted on the other end of said boom means for permitting gripping and shaking of the limbs of a tree for effecting removal of fruit therefrom, comprising the improvement wherein said shaking means includes a pair of opposed jaw members and means coacting with said jaw members for relatively moving same back and forth in a direction transverse to the longitudinal axis of said boom means for permitting opening and closing of said jaw members relative to the limb of a tree, and a shaker mechanism connected to said jaw members for moving same back and forth in said transverse direction through a relatively large amplitude at a relatively low frequency.

13. An apparatus according to claim 12, wherein said shaker mechanism includes rotatable eccentric means drivingly coupled to one of said jaw members for causing positive driving thereof when a limb is being shaken.

14. An apparatus according to claim 12, wherein said shaking means comprises a housing mounted on the other end of said boom means and projecting outwardly therefrom, said jaw members being mounted on the outer ends of levers which project outwardly from the housing, said levers being pivotally mounted on said housing for pivotal movement about a common axis perpendicular to the lengthwise extent of said boom means, said shaker mechanism being mounted on said housing and coupled to one of said levers.

* * * * *